(No Model.)
D. FORNIRASEO.
VALVE.
No. 409,031. Patented Aug. 13, 1889.
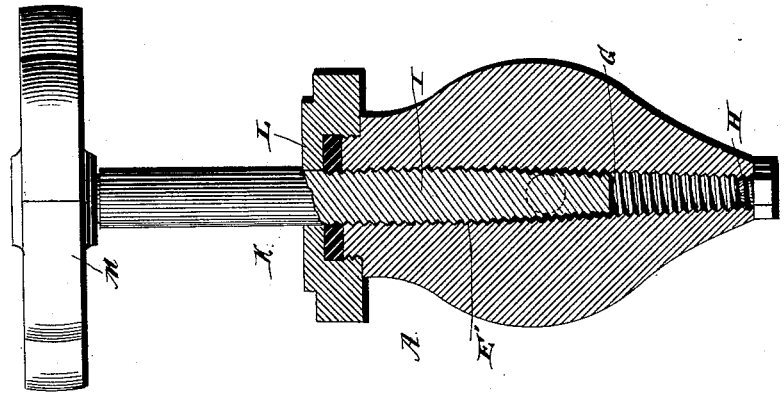
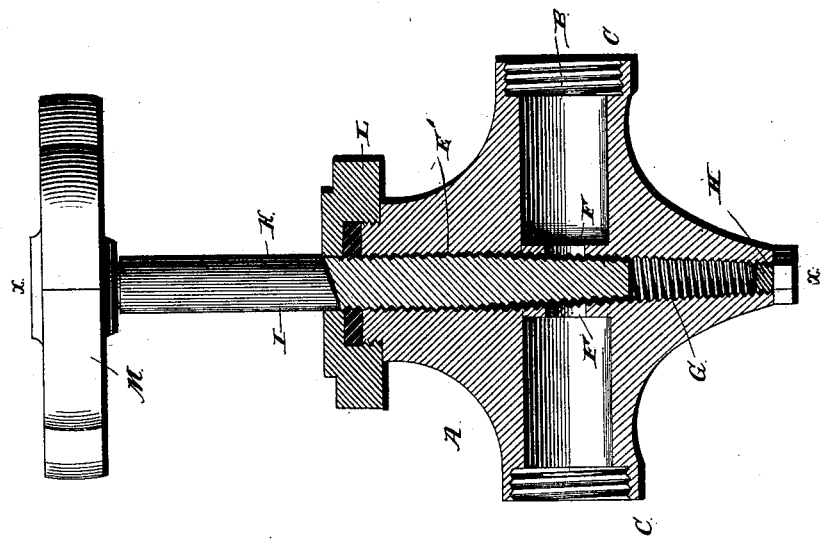
Witnesses
Inventor
Domenico Forniraseo.
By his Attorneys

UNITED STATES PATENT OFFICE.

DOMENICO FORNIRASEO, OF BELTON, TEXAS.

VALVE.

SPECIFICATION forming part of Letters Patent No. 409,031, dated August 13, 1889.

Application filed January 26, 1889. Serial No. 297,630. (No model.)

*To all whom it may concern:*

Be it known that I, DOMENICO FORNIRASEO, a citizen of the United States, residing at Belton, in the county of Bell and State of Texas, have invented a new and useful Improvement in Valves, of which the following is a specification.

My invention relates to an improvement in valves; and it consists in the peculiar construction and combination of devices that will be more fully set forth hereinafter, and particularly pointed out in the claim.

In the accompanying drawings, Figure 1 is a longitudinal sectional view of a gate-valve embodying my improvements. Fig. 2 is a sectional view taken on the line $x\,x$ of Fig. 1.

A represents the valve-case, which is of the usual form and is provided with a transverse opening B, provided at its ends with coupling-sections C, whereby pipes may be readily attached to the valve-case in the usual manner. Arranged vertically in the valve-case is a bore E, which is at right angles with the opening B and communicates with the latter through reduced openings F. That portion of the bore E between the upper end of the case and the point E', slightly above the openings F, is cylindrical in form and is provided with screw-threads G, and the remaining portion of the bore is tapered to the lower extremity of the case, and provided also with the threads G, growing gradually smaller in diameter toward said extremity, as shown. In the outer end of the bore is a plug H, which may be removed from time to time.

I represents the valve or gate, which is cylindrical in form, with the lower end of its body tapering, and said body is threaded and adapted to engage the threads G within the cylindrical end as well as in the inner end of the tapered portion of the bore. The stem K of the valve extends through a packing-gland L, screwed on the outer end of the valve-case, and the said stem is provided with a hand-wheel M, by means of which it may be rotated.

The operation of my invention is as follows: When the valve or gate is screwed home so that its tapered end fits snugly in the tapered portion of the bore, the space between the openings F is entirely closed, and communication is thereby cut off between the ends of the openings B. By unscrewing the valve the openings F may be uncovered to any desired extent to allow as large a quantity of fluid as desirable to pass around the stem I or below its lower end, and thus through the valve-case. Dirt and foreign substances accumulate in the lower portion of the tapered bore, and when the valve-case becomes foul the plug H may be removed and a pointed instrument inserted in the tapered portion of the bore to remove the dirt therefrom; or the said plug may be removed and the valve may be caused to partially uncover the openings F, and thereby cause the steam, water, or other fluid to escape through the tapered end of the bore and wash or blow out the dirt therefrom.

From the fact that the tapered portion of the bore commences at a point above the lateral opening F it will be obvious that when the stem is slightly unscrewed, as shown in Fig. 1, the fluid not only flows around the same in its passage through the valve, but a part of it will set up a current around the lower end of the stem, and thus cleanse the case of nearly all impurities. Further, as the stem is screwed home, when it reaches an almost closed position, the threads upon its tapered portion will take into those below the point E', all of them engaging simultaneously, and the valve will be suddenly entirely closed. A continued screwing of the stem farther and deeper engages all these threads until finally they are in such close and tight connection that no leak is possible.

It will be understood from the foregoing description that the valve-case may be cleaned while the valve is in use and without the necessity of cutting off the steam or water pressure. Another advantage flowing from the valve embodying my improvements is that, owing to the tapered form of the extremity of the valve or gate and the tapered form of a portion of the bore, the valve will be caused to fit snugly in its seat even after the screw-threads are partially worn, and hence the durability of the valve is very greatly enhanced.

Having thus described my invention, I claim—

The improved valve herein described, the same comprising the casing A, having a horizontal passage B, reduced at its central point, as at F, and a vertical bore E, intersecting said reduced portion E' above the point of intersection to its lower end and being screw-threaded its entire length, a stem I, having a tapered lower portion, the entire stem being screw-threaded to engage the threads in the bore, and a plug H, removably inserted in the lower end of the bore, substantially as described.

In testimony that I claim the foregoing as my own I have hereto affixed my signature in presence of two witnesses.

DOMENICO FORNIRASEO.

Witnesses:
E. G. SIGGERS,
J. H. SIGGERS.